United States Patent [19]
Dobbek

[11] Patent Number: 5,568,606
[45] Date of Patent: Oct. 22, 1996

[54] METHOD AND APPARATUS FOR MAXIMIZING EFFECTIVE DISK CAPACITY USING ADAPTIVE SKEWING

[75] Inventor: Jeffrey J. Dobbek, San Jose, Calif.

[73] Assignee: International Business Machines Corporation, Armonk, N.Y.

[21] Appl. No.: 321,142

[22] Filed: Oct. 11, 1994

[51] Int. Cl.$^6$ .................................................. G06F 9/00
[52] U.S. Cl. ........................... 395/182.06; 395/183.18; 395/185.07; 395/404; 395/428; 395/439; 395/462; 395/600; 364/DIG. 1; 364/282.1; 364/245.3; 364/246.3
[58] Field of Search .................................. 395/600, 404, 395/428, 439, 462, 182.06, 183.18, 185.07; 364/DIG. 1

[56] References Cited

U.S. PATENT DOCUMENTS

| | | | |
|---|---|---|---|
| 5,237,466 | 8/1993 | Glaser et al. | 300/73.03 |
| 5,285,436 | 2/1994 | Moribe | 369/158 |
| 5,303,097 | 4/1994 | Baba et al. | 360/73.02 |
| 5,359,611 | 10/1994 | Parks et al. | 371/404 |
| 5,416,648 | 5/1995 | Jeppson et al. | 360/73.02 |
| 5,438,464 | 8/1995 | Lewis et al. | 360/73.03 |

OTHER PUBLICATIONS

Legvold et al., R. F., IBM Technical Disclosure Bulletin, vol. 32, No. 11, pp. 85–92, Apr. 1990, "Record Mode Extension To Track Mode Caching ASD Subsystem".

Craft, D. J., IBM Technical Disclosure Bulletin, vol. 35, No. 1B, pp. 193–194, Jun. 1992, "Improved High–Availability DASD Sub–System Configuration".

*Primary Examiner*—Thomas G. Black
*Assistant Examiner*—Jean R. Homere
*Attorney, Agent, or Firm*—Merchant, Gould, Smith, Edell, Welter & Schmidt, P.A.

[57] ABSTRACT

A DASD array and method wherein spindles in the array are synchronized in speed of rotation and phase. The invention includes a plurality of spindles and at least one disk rotating around each spindle, wherein each disk comprises a plurality of tracks arranged into synchronization zones. The synchronization zones comprise a plurality of data sectors and an excess time period associated with each zone. The excess time period comprises raw and synchronization skew, wherein the skew is used to shift sector locations in response to excessive defects occurring in the synchronization zone on the disk. In this manner, the phase of the disks in the system are synchronized without consuming additional disk storage capacity. Each disk also contains skip profiles for controlling the distribution of unused sectors across the disks. The skip profiles are distributed to model the defect profile in the worst disk in the system. The skip profile and the skew are used in combination to shift sector locations back when defects are present.

16 Claims, 16 Drawing Sheets

Skip Profile Example – One Defect

No-ID

Skew Allotment = 2
Profile Allotment = 1

□ => defect
△ => profile skip

METHOD AND APPARATUS FOR
MAXIMIZING EFFECTIVE DISK CAPACITY
USING ADAPTIVE SKEWING

BACKGROUND OF THE INVENTION

1. Field of the Invention

This invention relates in general to multiple disk drive array storage devices (DASD), and more particularly, to a DASD array and method wherein spindles in the array are synchronized.

2. Description of Related Art

Disk drives have long been popular mass storage devices. They provide a cost-effective answer to the problem of non-volatile data storage. Pressure is continually being exerted on digital data storage system designers to increase the storage capacity and data processing capabilities of such systems. Initially, the focus was on providing higher density disks. This involved various techniques for reducing the physical space which the recorded date occupied. Another technique for providing additional storage utilizes multiple disks. However, multiple disk systems create unique challenges of their own.

The basic structure of disk drives consists of a metal disk coated with magnetic material rotating under one or more read/write heads. A DASD is a multi-platen system where a number of the metal disks are arranged in a stack. Digital data is recorded on disks in the form of magnetic transitions spaced closely together on concentric circles called "tracks". Disk drives contain detectors for indicating when the magnetic head is positioned at the outermost track. A stepper motor (or servo-controlled linear motor) controls the head position by causing the head to step from track to track.

Once a track is selected, it is necessary to wait for the desired location to rotate into position under the head. Within each track, information is organized into segments called "sectors". A sector can consist of any number of bytes, limited only by the storage capacity of the track. The addressing of sectors has typically been a software function. Thus, each sector normally has been proceeded by an identifier block so that the sectors can be identified by the software.

New methods have been devised for recording data wherein the recording head locates and identifies data sectors without using data ID fields. Further information on the no-ID disks is disclosed in the co-pending and commonly assigned application Ser. No. 08/173,541 filed on Dec. 23, 1993 by Steve Hetzler and William Kabelac entitled "SECTOR ARCHITECTURE FOR FIXED BLOCK DISK DRIVE", which application is hereby incorporated by reference. Data sectors are identified using information obtained from electronic storage and from servo sectors which need not be adjacent to the data sectors. The tracks contain servo information and data, but not data sector ID information.

Nevertheless, both radial track density and linear density along a track have increased to the point that imperfections known as media defects in the magnetic recording layer pose a problem. At very high densities, these imperfections impact the recording of the digital data across several transitions. As can be appreciated, this problem is compounded in DASD devices.

In DASD arrays, a number of different spindles must be synchronized. In such systems, it is often desirable to synchronize the rotation of all disk drives in the system to one master index and maintaining a constant lock to this index. Synchronization becomes very difficult when one of the spindles has a large number of the above-mentioned sector defects. Once a defect in encountered on any of the disks, all of the data on the disks with defects will be shifted in time as compared to a disk without defects. Data is written on the good file and the write head must wait until the defects are passed over on the defective disk until an acceptable area for writing data is encountered. Thus, the data on the defective disk will be out of phase by that many sectors. The spindle with the defects tends to lag more and more behind the other spindles.

In some prior systems, spindle synchronization has been carried out by allocating a sufficient number of spare sectors on each track to compensate for bad sectors. However, the allocations of disk space as spare sectors require a large overhead of disk space. These disk systems would allocate certain sectors as spares at fixed intervals on the disk. The data which would have normally been written in the defective sector is then written in the spare. The other data would be written in phase with the data on the non-defective disk.

For example, ten spares could be allocated at the end of every cylinder. If five defective sectors were encountered in that zone, then the data corresponding to the defective sectors would be written in the first five spare sectors. After reaching the end of the spares, the head would come to the next cylinder or zone where the disks would again be in synchronization.

However, allocating disk surface for spares, which may or may not be needed, is wasteful and thereby reduces the effective capacity of the disks. In this type of system, statistical analysis is performed to determine the number of spares needed. However, in actual tests the unused spare sectors accounted for between 2.5% to 3% of the total disk space. Furthermore, there may be instances when the number of defects may exceed the number of spare sectors allocated for that particular zone. In this situation, a spare would have to be stolen from the next zone. This means that the data allocated to these additional spare sectors would be moved out an additional amount of time. This would also negatively affect the head skew thereby necessitating an additional revolution of the disks.

It can seen then that there is a need for a DASD array and method wherein spindles in the array are synchronized in speed of rotation and phase.

There is also a need for a disk drive system having a plurality of spindles wherein synchronization is provided without wasting storage capacity due to unused spare sectors.

SUMMARY OF THE INVENTION

To overcome the limitations in the prior art described above, and to overcome other limitations that will become apparent upon reading and understanding the present specification, the present invention discloses a multiple disk array storage device and method wherein spindles in the array are synchronized in speed of rotation and phase.

The present invention solves the above-described problems by dividing disk drives in a multiple disk drive array storage device into synchronization zones. The present invention utilizes spindle skew to control the sector locations of given logical customer data sectors.

A system in accordance with the principles of the present invention comprises a plurality of spindles and at least one disk rotating around each spindle, wherein each disk comprises a plurality of tracks arranged into synchronization zones. All of the spindles have the same configuration. The synchronization zones comprise one or more data sectors and an excess time period associated with each zone. The excess time period comprises raw and synchronization skew, wherein the synchronization skew is used to shift sector locations in response to excessive defects occurring in the synchronization zone on the disk thereby synchronizing the phase of the disks in the system without consuming additional disk storage capacity. Each disk drive also contains skip profiles for controlling the distribution of unused sectors (spare and defective) across each disk drive. The skip profiles are distributed to model the manufacturing defect profile in the average worst disk in the system. Finally, the skip profile and the synchronization skew profile are designed to smooth excessive defect profiles in a zone by dividing the excessive defects in half and distributing half of the defects to the zone before the bad zone and half of the defects to the zone after the bad zone.

Thus, the invention uses the excess skew located periodically across the disk drive to shift subsequent sector locations back when defects are present. In addition, the fixed uniform distribution of skips across the entire surface of the disk drive is maintained. Excess capacity, which is not allowable for use, is converted to make all files look very similar from a skip profile point of view.

One aspect of the present invention is the sector location phase between disk drives without defects and disk drives with defects which is maintained within predetermined boundaries.

Another aspect of the present invention is that a tolerance of "bad" sections of the disk drive is provided wherein additional revolutions are not caused when a defect profile is determined to be excessive.

Another aspect of the invention is that synchronization zones contain a number of tracks and an excess time period used for buffering which allows disks with sector defects to keep pace with other disks.

Yet another aspect of the invention is that the distribution of defects or skips across all drives is controlled.

These and various other advantages and features of novelty which characterize the invention or point out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

Figure 1:
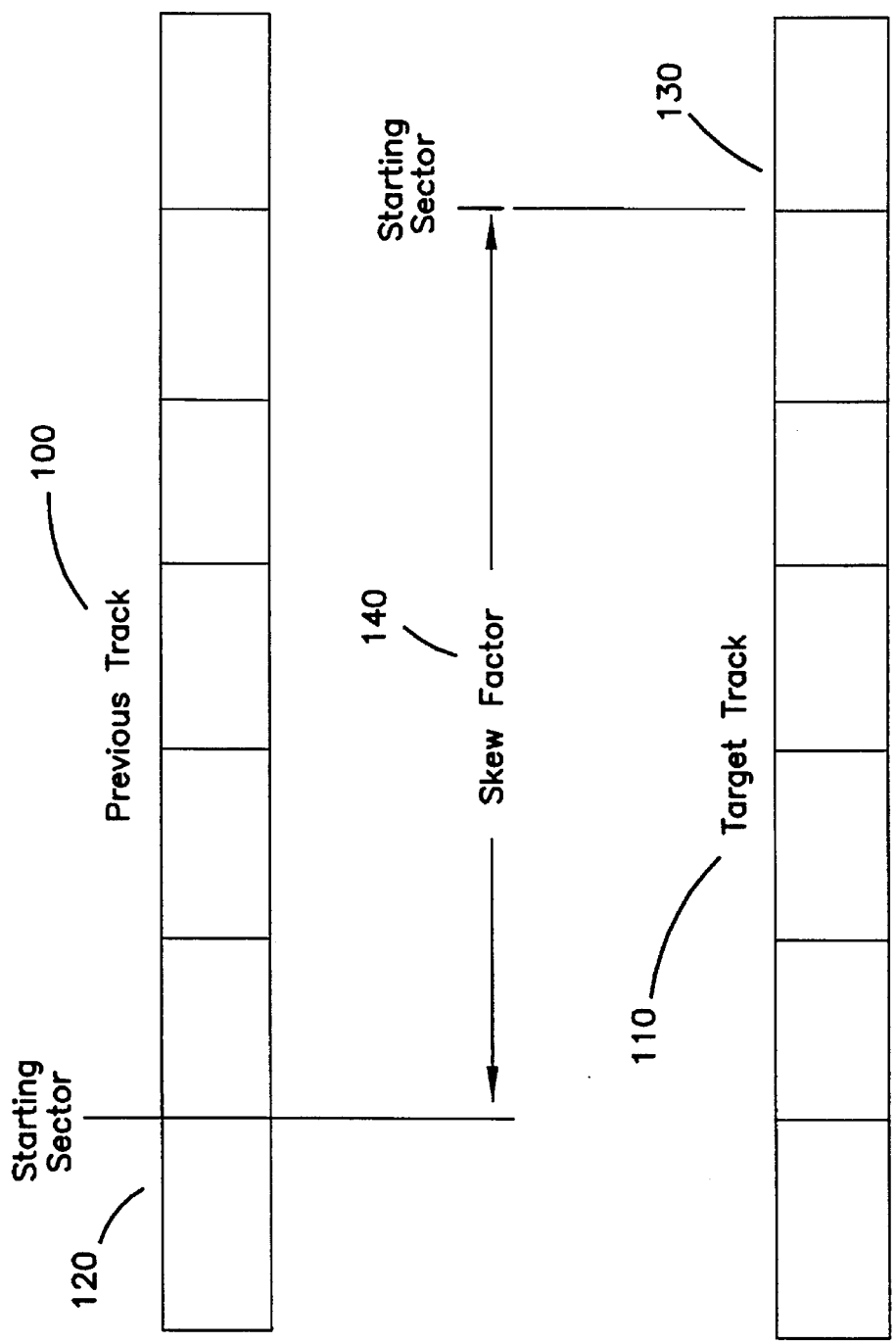
FIG. 1 is a diagram of the general skew when switching from a previous track to a target track.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a multiple disk array storage device and method wherein spindles in the array are synchronized in speed of rotation and phase. The purpose behind the invention is to create a spindle sync environment wherein capacity overhead in not required. The servos are synchronized and a sparing strategy is provided.

There are four components of skew: track, cylinder, zone (notch), and synchronous skew. Each of these will be discussed below. Since the invention does not require IDs to facilitate skew, the problem is solved with a computation as well as with an adaptation if the file is in spindle synchronize mode. Nevertheless, those skilled in the art will recognize that skew could be written in the IDs.

A head switch requires a finite amount of time. In order to minimize the latency penalty when performing sequential operations across track boundaries, logical block addresses must be staggered by some number of sectors. That number of sectors is called the track skew factor. The track skew factor accounts for the time required to physically switch heads and is measured in data sectors.

A cylinder switch requires a finite amount of time. In order to minimize the latency penalty when performing sequential operations across cylinder boundaries, LBAs must be staggered by some number of sectors. The number of data sectors is called the cylinder skew factor. The cylinder skew factor accounts for the time required to physically switch cylinders and is measured in data sectors.

A notch switch also requires a finite amount of time. Notch switching is also referred to as switching zones. In order to minimize the latency penalty when performing sequential operations across notch or zone boundaries, LBAs must be staggered by some number of sectors. That number of sectors is called the notch skew factor. The notch skew factor accounts for the time required to change notch parameters and become ready to access an LBA in the new notch and is measured in data sectors.

Non-synchronous skew is the default skewing method. Compared to the synchronous skew method it has the potential to allow greater throughput during formatting by not selecting any of the synchronized spindle modes through a mode select command. Non-synchronous skew uses the last LBA sector on the previous track as the reference from which to determine the starting sector on the target track. The starting sector on the target track can be determined using the following equation:

$$[LBA_{LS}+S_F+1]^{ModuloDataSectors/Track}$$

where $LBA_{LS}$ is the last LBAs sector, $S_F$ is the skew factor.

FIG. 1 illustrates the general skew when switching from a previous track 100 to a target track 110. These two tracks do not have to be adjacent tracks. A certain amount of time is required for the head to switch from the previous track to the target track. Since the disk is rotating, this block of time is represented by a delay. Thus, the last sector 120 from the previous track 100 does not align with the first sector 130 in the target track 110. Therefore, the skew factor 140 must be sufficiently large to allow the head to make the transition from the previous track 100 to the target track 110.

In an array environment it is desirable to line up the transfers of all of the drives and arrays such that at given intervals all of the files are flying over the same LBA at the same time. There are two components to achieving this result. First the indexes of all devices must be locked with each other. This is accomplished with one device being assigned as a master and the rest are locked to its index.

Secondly as defects are found across the file and not others, there would be a negative phase shift between files with and files without defects. This phase would actually grow until the defect count is an even multiple of sectors per track. At this point the phase angle would once again be zero. This would result in a phase shift of a half revolution on the average. Synchronized skew is utilized to overcome this unacceptable situation.

Synchronized skew is designed to keep the radial position of the first LBA in a synchronization zone of all files the same (a multiple of cylinders approximately 7.5 Megabytes long). The approach is to "buffer" the sync zone with overage of skew (not spares). This is done by locating extra skew at the end of each sync zone. This skew component is a function of the defects prior to and including the zone, the defect rate of the file, and sync zones in close proximity to this zone. Also note that the synchronous skew is simply a skew adjustment which is applied at sync zone boundaries as opposed to cylinder, track or notch. It is "roughly" the skew allotment for a sync zone minus the number of defects in the sync zone. The term "roughly" is used because there are adjustments to the synchronization skew during formatting of the disks to anticipate and correct "bad" zones.

Figure 2:
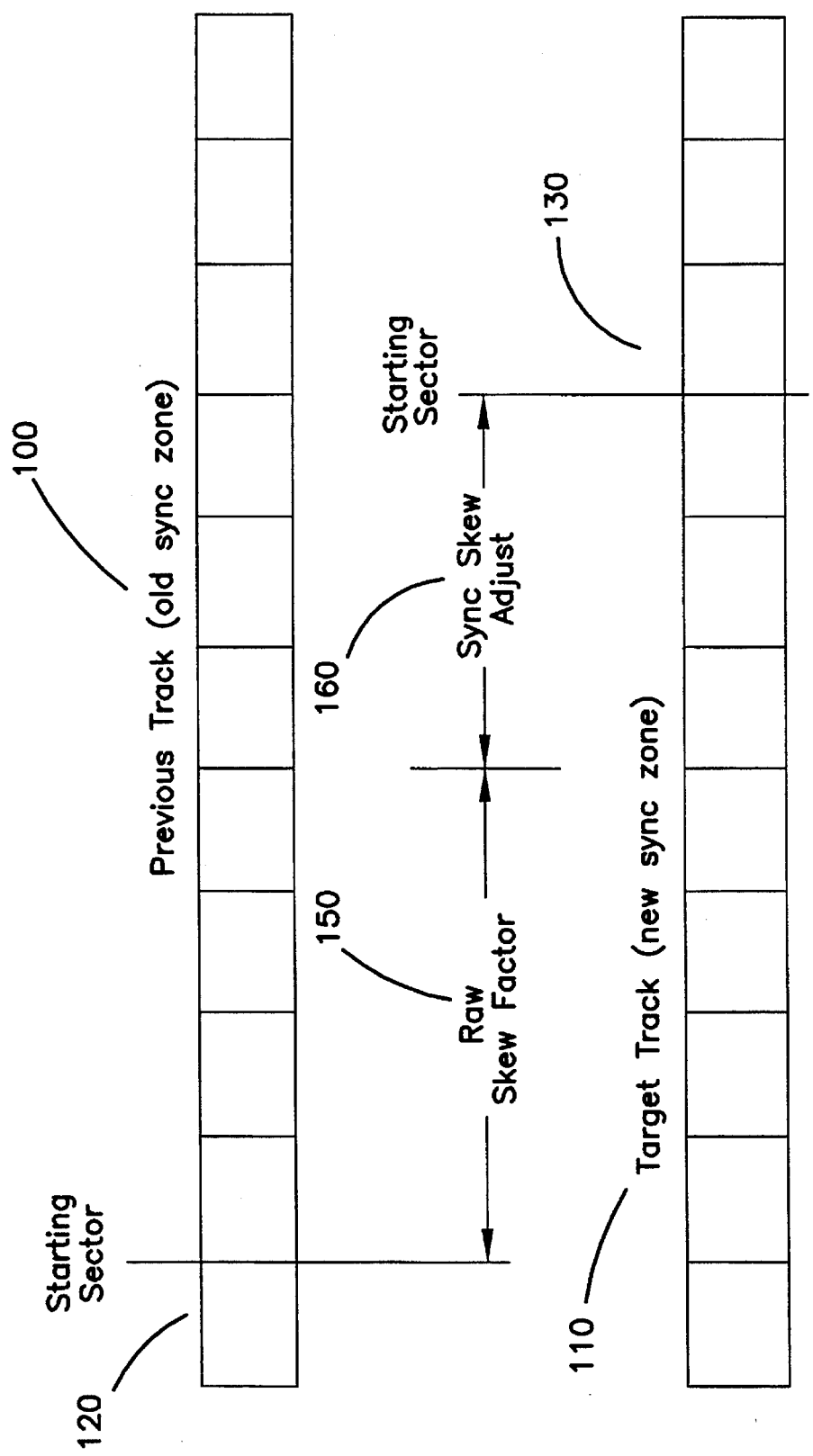
FIG. 2 is a diagram of the raw and synchronous skew from a previous track to a target track.

FIG. 2 illustrates the synchronous skew from a previous track 100 to a target track 110. The delta is comprised of raw skew factor 150 and a sync skew adjust 160. Thereafter the starting factor for the target track is found.

Figure 3:
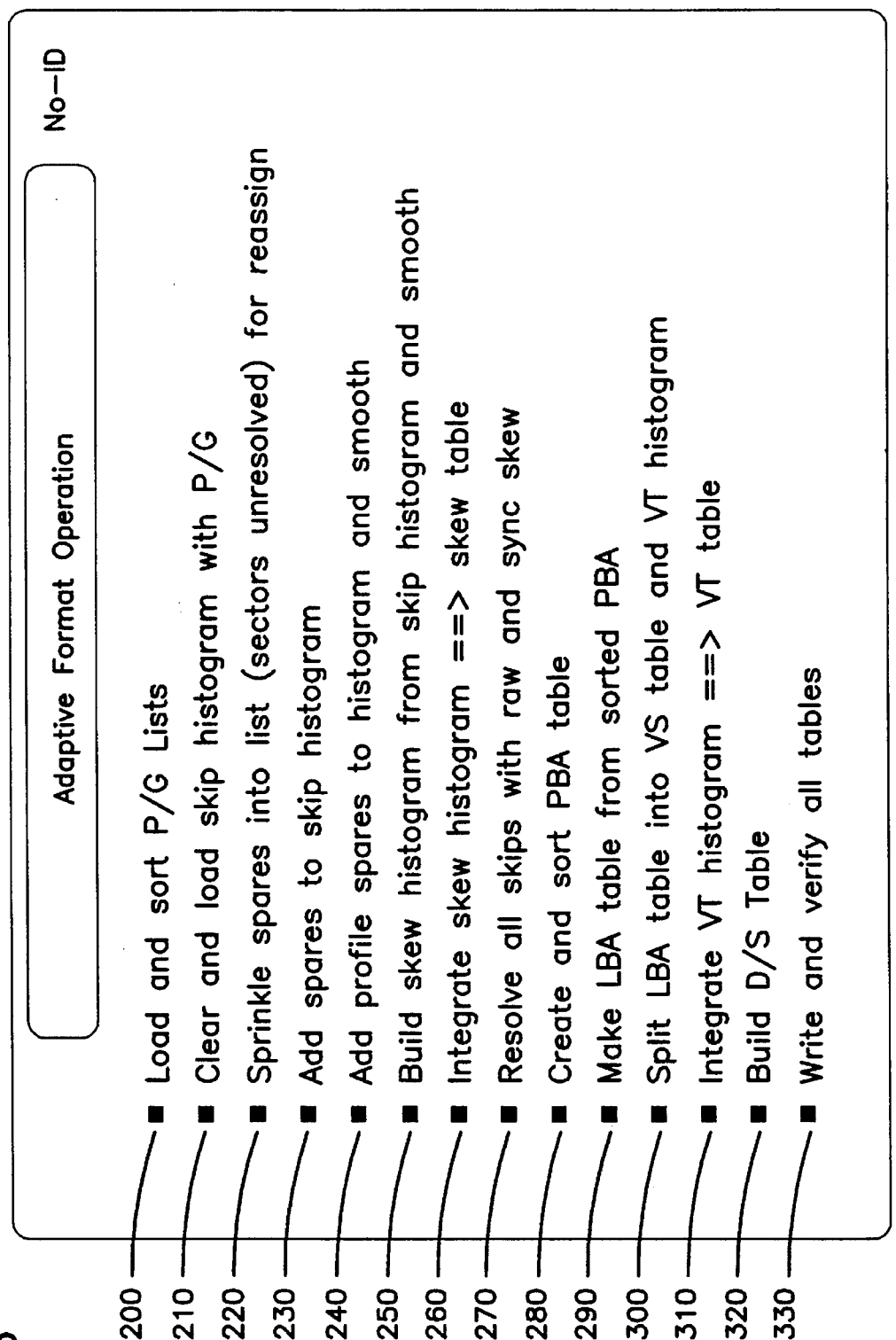
FIG. 3 is a list of the adapted format operations for the invention.

FIG. 3 illustrates a list of the adapted format operations. First, the P\G list are loaded and sorted 200. Next the clear and load skip histogram is performed with P\G 210. Reassign spares are added into the list with sectors unresolved 220. Reassign spares are added to the skip histogram 230 and profile spares are then added to the histogram and smoothed 240. A skew histogram is built from the skip histogram 250 and the skew histogram is integrated into the skew table 260. All skips are resolved with raw and sync skew 270. A PBA (physical block address) table is created and then sorted 280. A LBA table is made from the sorted PBA 290. The LBA table is split into a virtual sector (VS) table and virtual track (VT) histogram 300. The VT histogram is integrated into the VT table 310. A D/S table is built 320. All tables are then written and verified 330.

Figure 4:
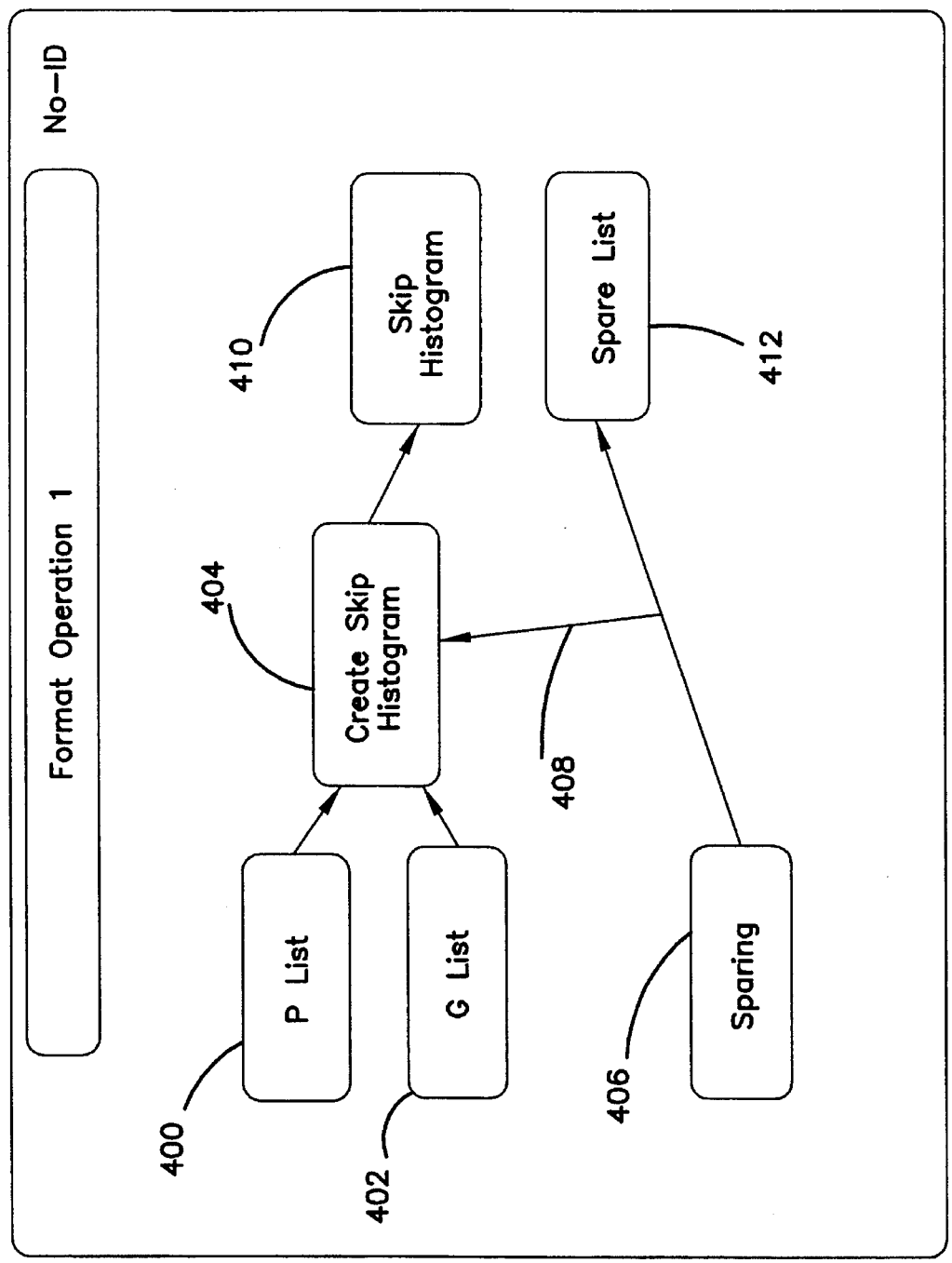
FIG. 4 is a flow chart of a first format operation.

FIG. 4 illustrates a flow chart of a first format operation. The P list 400 and the G list 402 are used to create a skip histogram 404. Sparing 406 is entered into the creation of the skip histogram 408 thereby resulting in the skip histogram 410 and a spare list 412.

Figure 5:
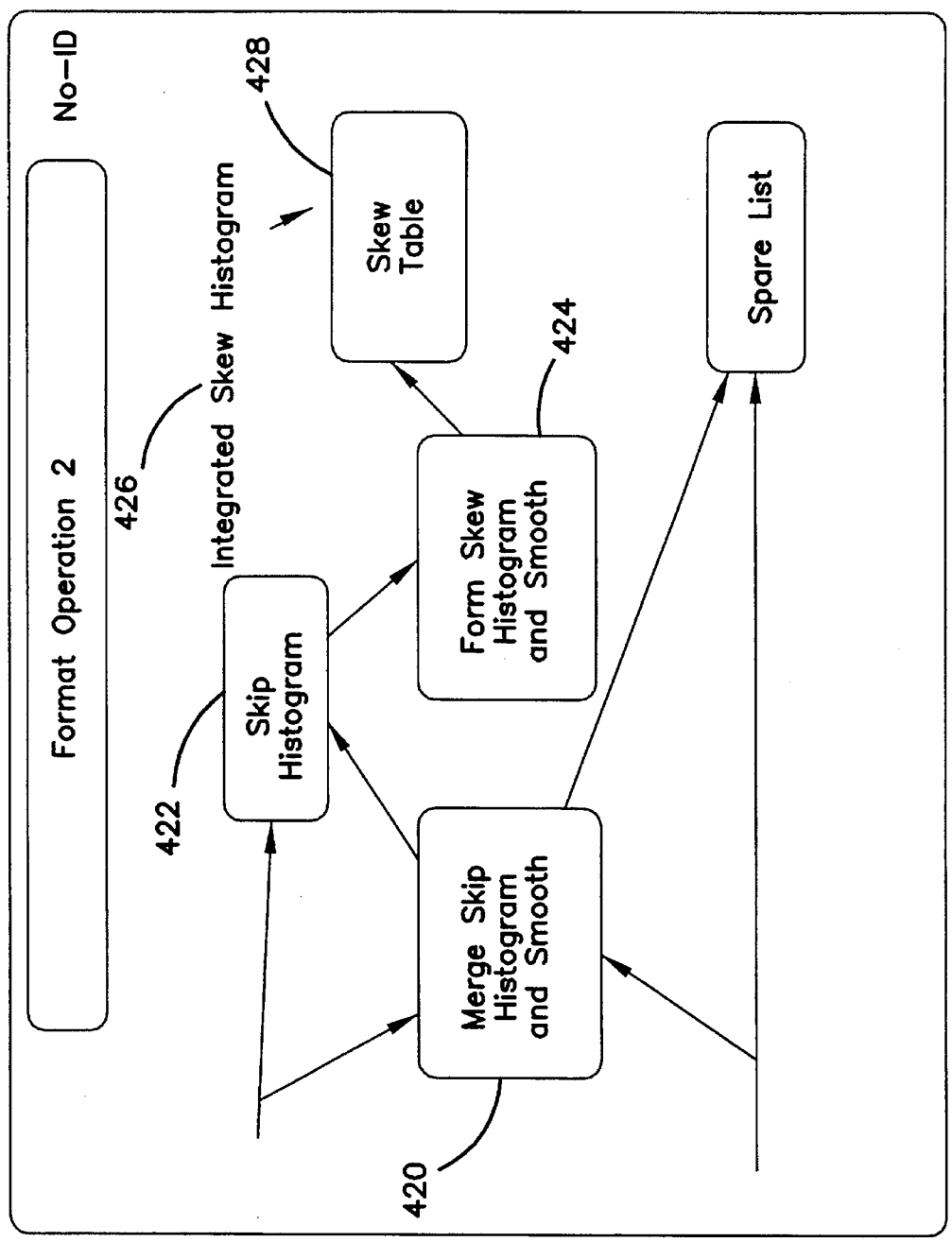
FIG. 5 is a flow chart of a second format operation.

FIG. 5 illustrates format operation two. The skip histogram is merged and smoothed 420. This data is entered into the skip histogram 422 to form the skew histogram 424. The skew histogram 424 is then integrated 426 to form the skew table 428. Finally the spare list 430 is formed from the merged skip histogram 420 and all known spares.

Figure 6:
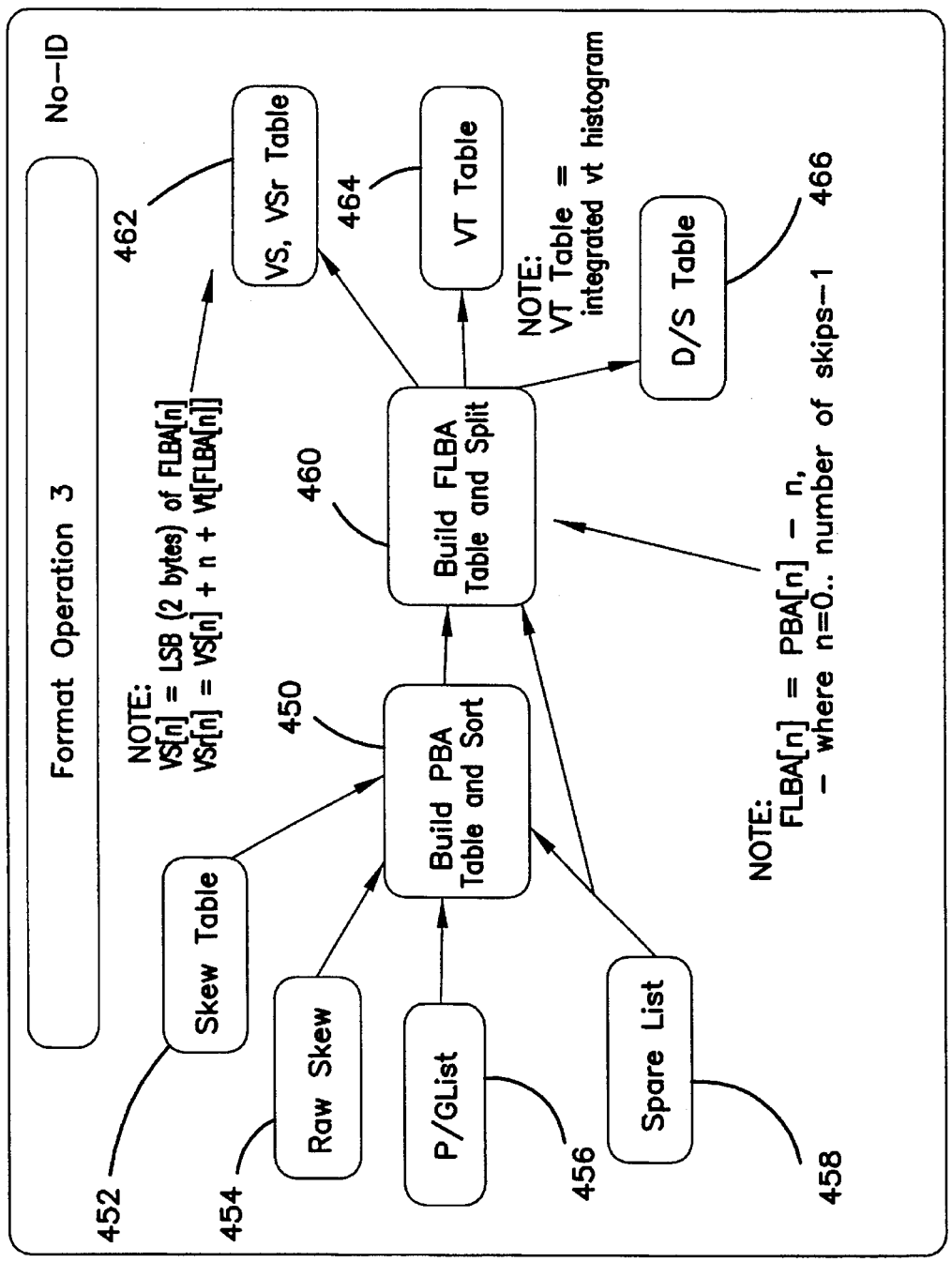
FIG. 6 is a flow chart for the third format operation.

FIG. 6 illustrates the flow chart for format operation number 3. A Physical Block Address (PBA) table is built and sorted 450. The PBA table is based upon data from the skew table 452, the raw skew 454, the P/G list 456 and the spare list 458. A file LBA table 460 is built based upon the PBA table 450. From this data the VS, VSr table 462 is created along with the VT table 464. In addition the D/S table is generated 466 with use of the spare list 458.

The following discussion relates to the determination and explanation of the synchronization zones. A synchronization zone is chosen having a predetermined number of tracks with S sectors. Furthermore, a maximum phase shift can be utilized by limiting the synchronization zone to a preset size. In order to transfer S sectors, S sectors of time are required. If D defects are present, S+D sectors of time are required to effect the transfer thereby placing the next synchronization zone at a location which is D sectors farther than without defects. An additional A sector of time could be added at the end of the no defect sync zone to maintain a constant transfer time of S+A. If A were sufficiently large, it could be reduced by D (define A' as A−D) such that S+A=S+A'+D. A is defined as the synchronization control allowance and A' is defined as the adjusted synchronization skew.

Figure 7:
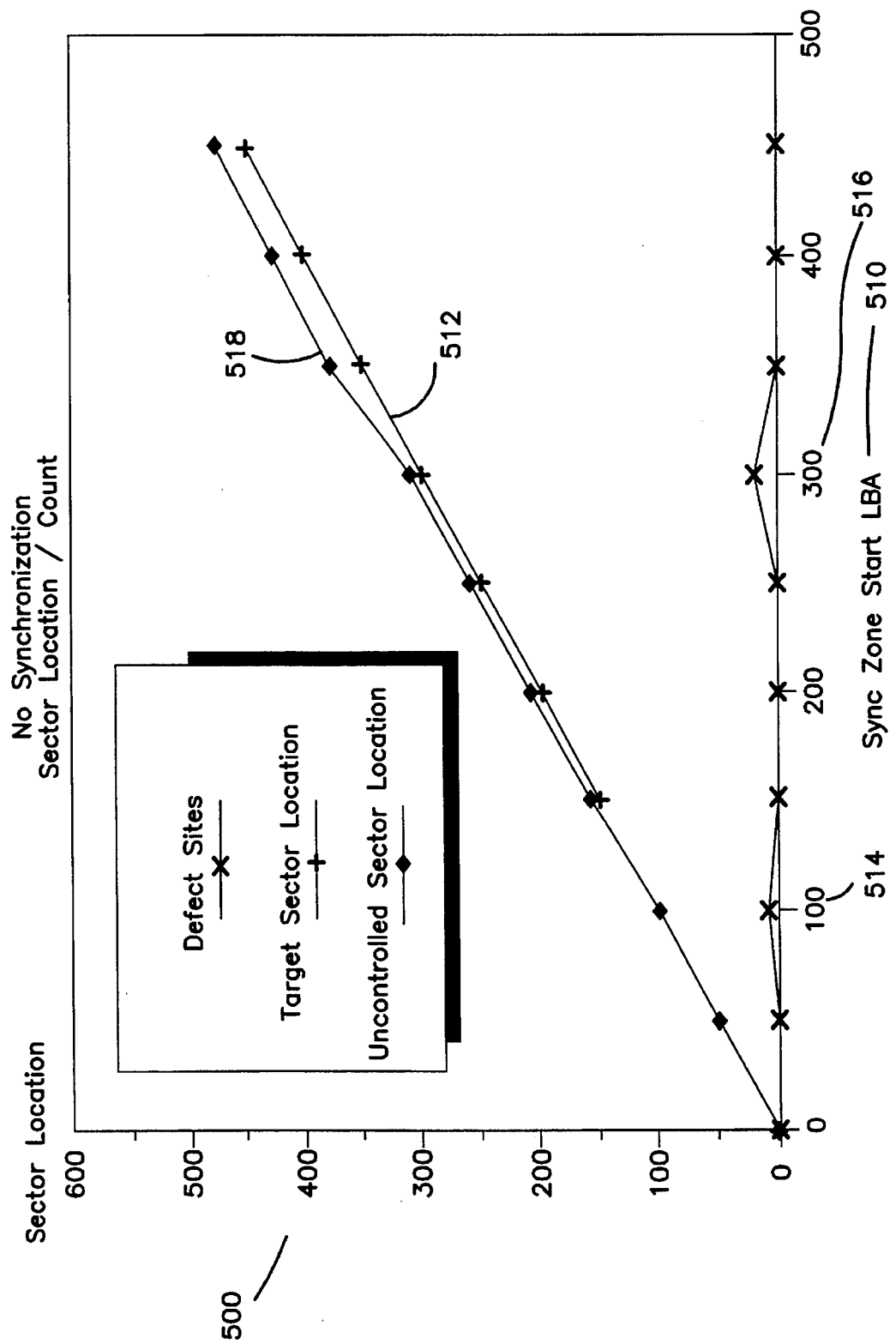
FIG. 7 is a plot of the sector location vs. count for a system with no synchronization.

FIG. 7 is a plot of the sector location 500 vs. count 510 for a system with no synchronization. The straight line represents the target sector location 512. Defect sites are illustrated along the sync zone start LBA axis 510 at zone 2 514 and zone 6 516. The uncontrolled sector location is illustrated by the top line 518.

Figure 8:
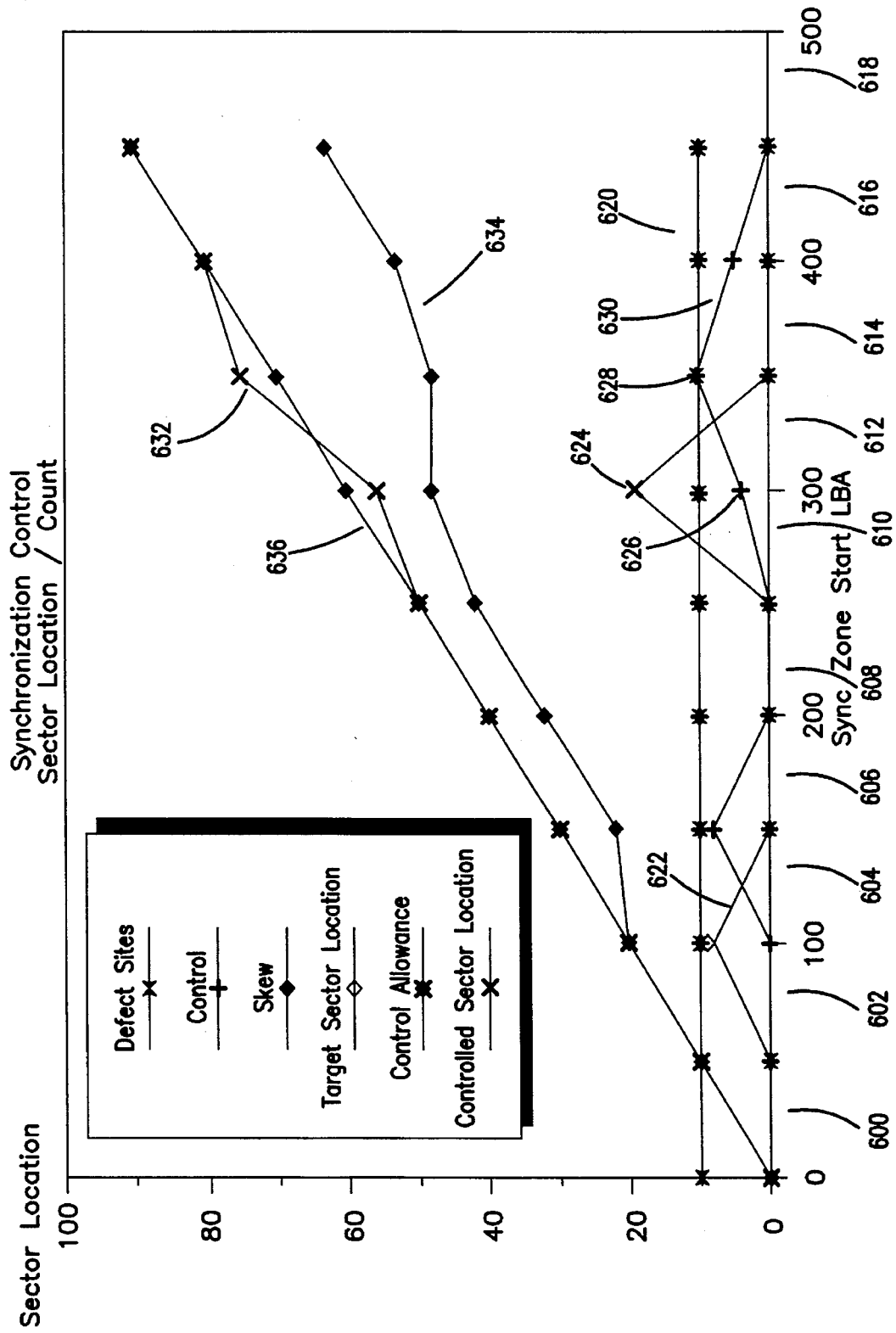
FIG. 8 illustrates the sector location response of the invention.

FIG. 8 shows the sector location response of the invention. There are several parts to FIG. 8 which will be described herein. First, each synchronization zone contains 50 sectors which would be synchronization zones 0 through 10 600–618. For example, in synchronization zone 2 (LBA 100–150) 604 there are 8 defects and in synchronization zone 6 612 there are 19 defects. The control allowance 620 for this system is set to 10 sectors per synchronization zone. The first set of defects 622 falls below this control allowance and is controlled by the next synchronization zone 606.

The second set of defects 624 rises above the control allowance 620 and is smoothed out by the system by placing approximately half of the overage (in this case 4) before the normal control point 616, 10 (the control allowance) at the control point 628, and 5 after the control point 630 therein totalling 19. The system anticipates the peak by making a move before the peak. Thus, the maximum lack of synchronization is smaller. No revolutions of the disk are wasted because of the bad peak. Previous systems would not tolerate this.

Each curve skew, target sector location, and controlled sector location is a plot of sector location minus the start of LBA of the synchronization zone. This example demonstrates the additional skew added to the sector location. A perfect drive with no defects would follow the target sector location curve 630, whereas the drive with the 8 and 19 defects would follow the controlled sector location curves 632. The skew curve 634 is driven by the following equation:

$$[SZ \times C_a] - \epsilon C_{<SZ}$$

wherein SZ is the synchronization zone, $C_a$ is the control allowance, and $C_{<SZ}$ is the control prior to the synchronization zone.

This skew curve 634 would be stored as a table because of the iterative nature of the control smoothing and would be built at format time so that performance would not be affected at run time. It is stored mod sectors/track.

Every time defects are found, the control tries to shift in time all sectors following the synchronization zone by the same amount. This also brings the track, cylinder, or zone skew closer in time. The worst case of this would be if the number of defects modulo data sectors per track were one less than the data sectors per track. In this case there would be one sector at the beginning of each track which was in sync but the rest would be out of sync by the track, cylinder or zone switch time. This switch time corresponds to the boundaries noted earlier. If there are 200 data sectors on a track, then a skew of 10 sectors per track, cylinder or zone switch would create a 0% to 5% (10/2) "out of sync" penalty over a full track transfer.

FIG. 8 also can be used to illustrate the skip profile sectors added to fill out the desired profile. Each curve skips added, target sector location, and controlled sector location is a plot of sector location minus the start LBA of the synchronization zone. This example demonstrates the additional skips added to the sector location.

The skips added is simply the sum of previous skips added to fill out the desired profile and are added to the skip tables for the file. Once laid out, the skips added are considered spares but the defect management does not know the difference unless a re-assign occurs. This skip profile would be built by the format command and would involve a smoothing process which would try to dip the profile on both sides of a really bad zone so as to disturb adjacent zones half as much as a one way smoothing process.

When bad zones exceed the limits of the desired skip profile, then some relief would be desirable. The skew allowances are designed to be on the order of twice as big as the skip profile allowance described herein. This allows the adaptive skew to pick up excess defects and smooth them.

Figure 9:
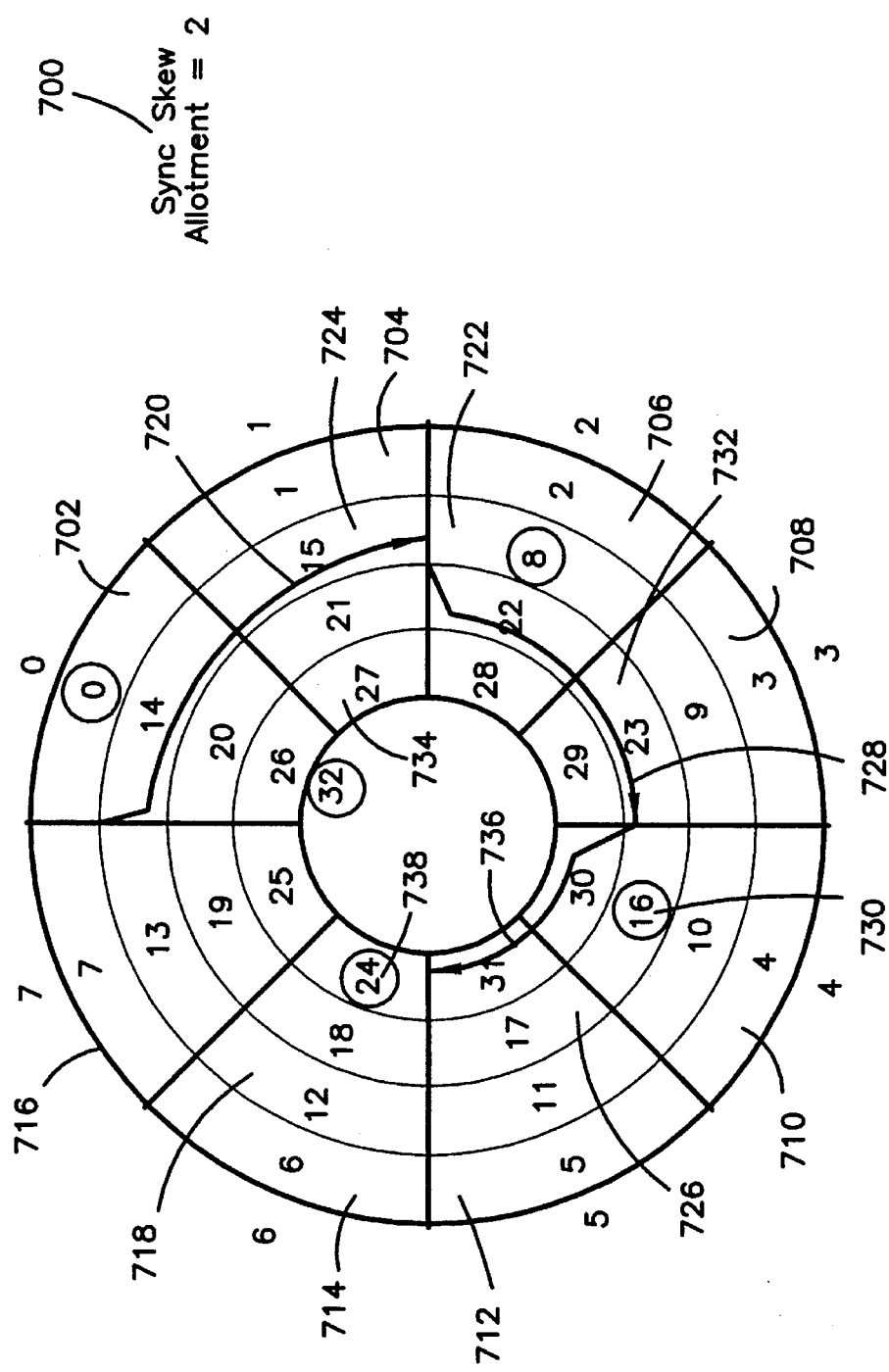
FIG. 9 illustrates a disk having no defects formatted with a sync skew.

The following examples illustrate the implementation of the synchronization skew and the skip profiles. FIG. 9 illustrates an example of a disk formatted with a sync skew wherein the file is perfect (i.e., no defects). For illustrations purposes, the spindle sync zone is shown as comprising a single track in FIG. 9. However, those skilled in the art will recognize that any number of tracks may be included in a synchronization zone. The sync skew allotment is set at 2 700. It is shown recorded in the outer sync zone and sectors 0-7 702-716. The head then moves to the second innermost sync zone 718 with a delay of two sectors 720 before sector 8 722 is recorded. The track 718 is utilized completely until sector 15 724 is recorded and then again the heads move to the third innermost zone 726 and skips two sectors 728 before sector 16 730 is recorded. The zone 726 is completed by the recording of sector 23 732 and finally the innermost zone 734 is recorded beginning with a delay of two sectors 736 at sector 24 738.

Figure 10:
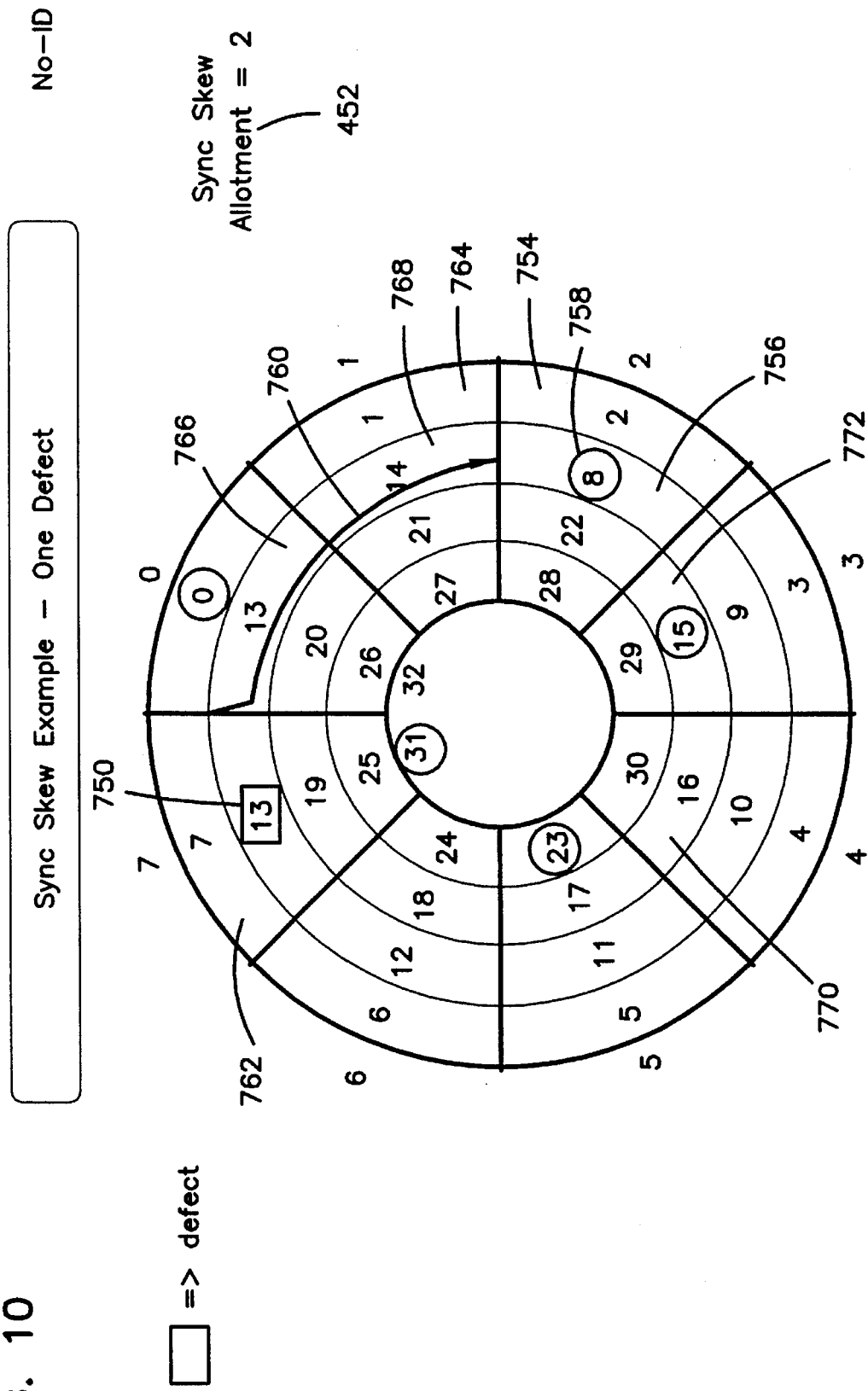
FIG. 10 illustrates a disk having one defect that is formatted with sync skew.

FIG. 10 shows an example of a sync skew with one defect 750. Again the sync skew allotment is set at 2 752. The outermost zone 754 is completed for sectors 0 through 7. Sector 8 756 is recorded in the next most inner zone 758 at a sector spacing of 2 760 from the last sector recorded 762 in the outermost zone 764. Sectors are recorded until a defect occurs in sector 13 750. Since the defect is found in that particular sector, sector 13 766 is not written until the next sector. Then sector 14 768 is recorded thereby filling the second outermost zone 758. If a defect had not occurred in the second outermost zone, sector 16 770 would have been recorded as shown. Thus, sector 15 772 is recorded in the sector prior to sector 16 770. The remaining sectors are arranged as described with reference to FIG. 3.

Figure 11:
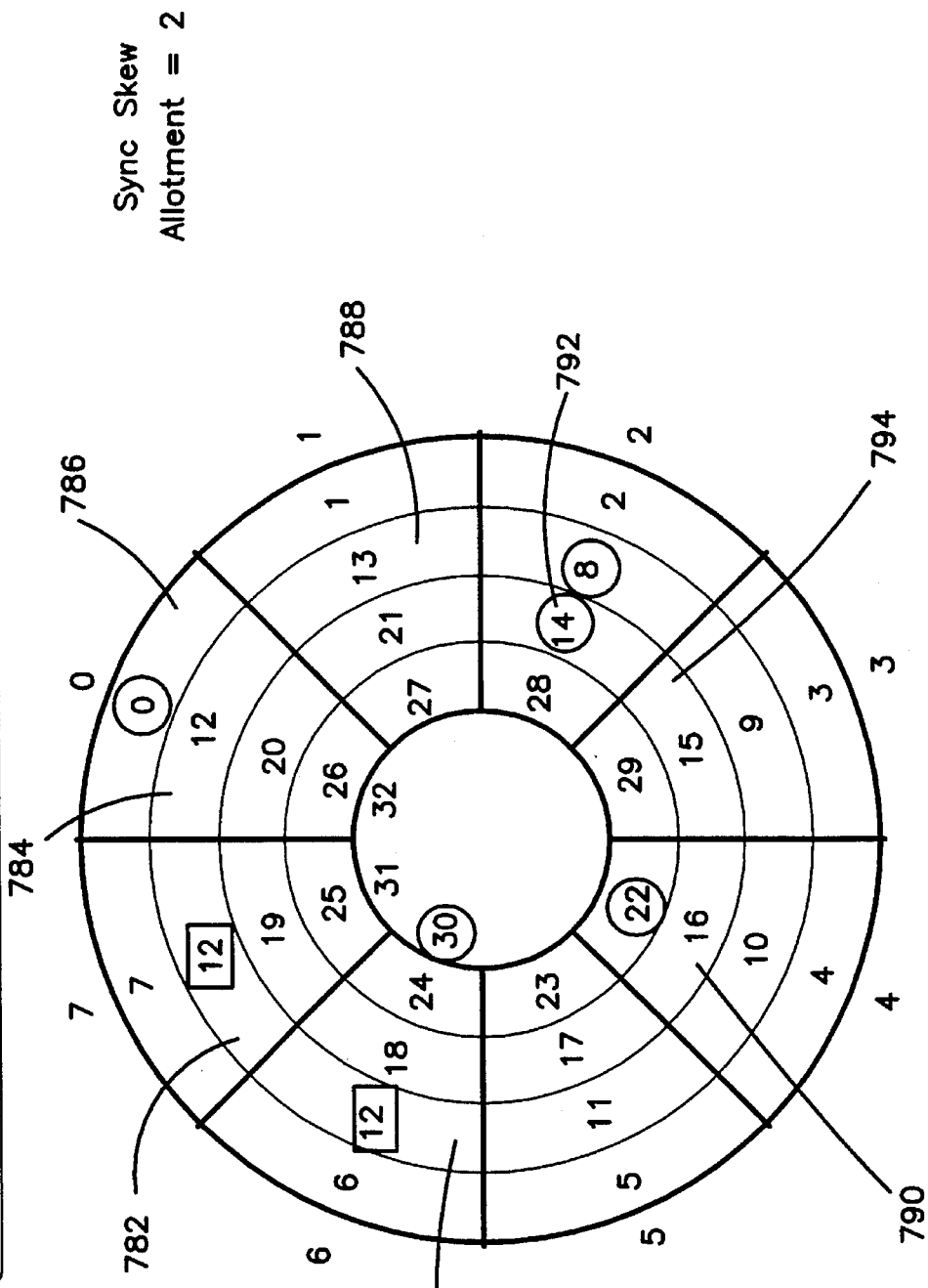
FIG. 11 illustrates a disk having two defects that is formatted with sync skew.

FIG. 11 illustrates an example of sync skew wherein two defects occur on the disk. Sectors are recorded as previously described until sector 12 780 is encountered. Here two consecutive sectors 780, 782 contain defects. Thus, the data for sector 12 is not recorded until the sector 784 which aligns with sector 0 786 is encountered. The second outermost zone is then completed by writing sector 13 788. Again, sector 16 790 is held in place and sector 14 792 and sector 15 794 occur in the sectors immediately prior to sector 16 790 on the second innermost zone. The remaining sectors are filled according to the general description.

Figure 12:
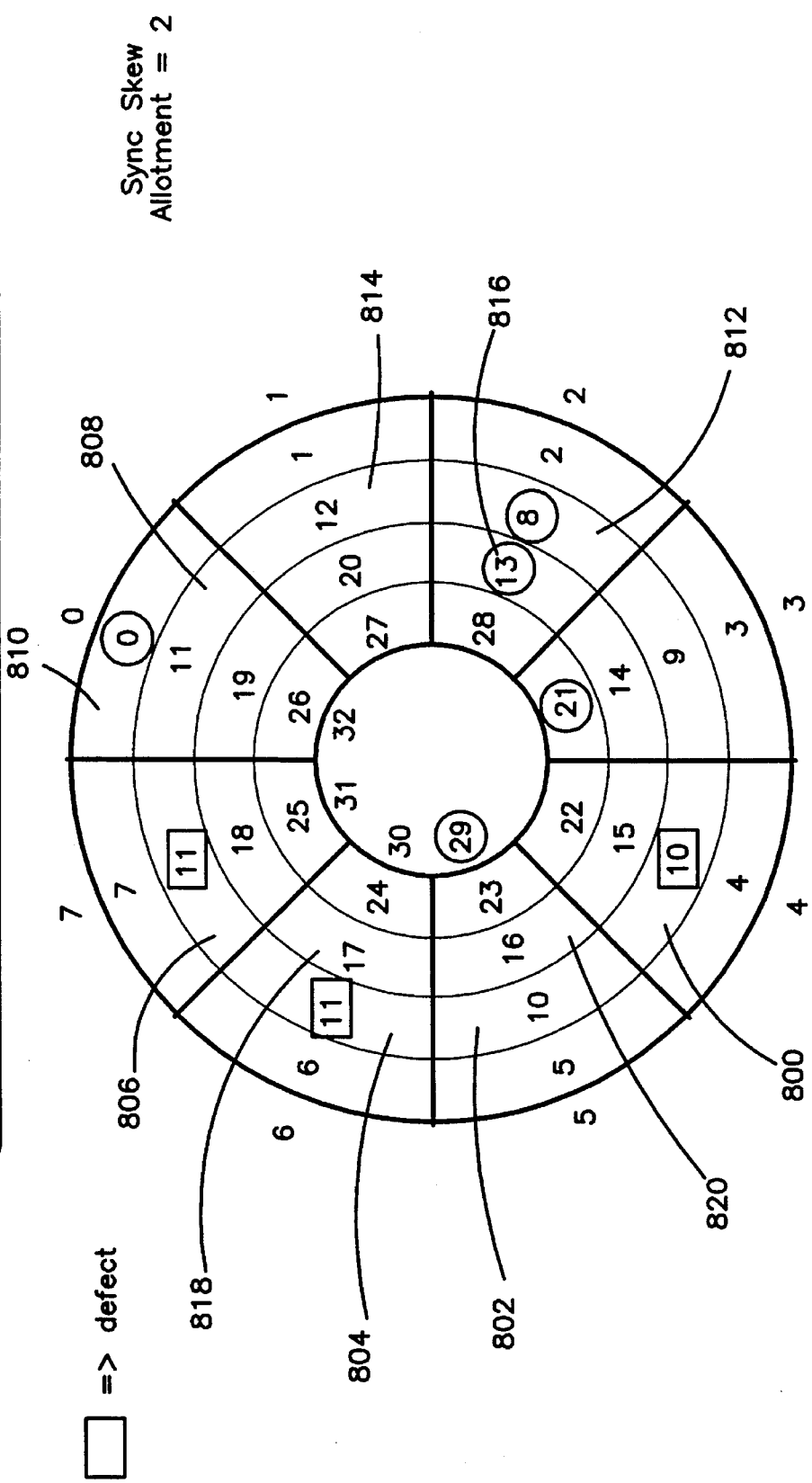
FIG. 12 illustrates a disk having three defects that is formatted with sync skew.

FIG. 12 is an illustration of a sync skew with three defects. The first defect occurs in the initial writing of sector 10 800. Thus, sector 10 is pushed out into the next sector 802. Two defects occur in the two next sectors 804, 806. Thus, sector 11 808 is written in the sector which aligns with sector 0 810. The second outermost zone 812 is completed by writing in sector 12 814. Sector 13 816 is recorded immediately in the next sector on the next innermost zone 818. Thus, sector 16 820 is pushed out one sector. The remaining sectors are filled according to the normal description.

Figure 13:
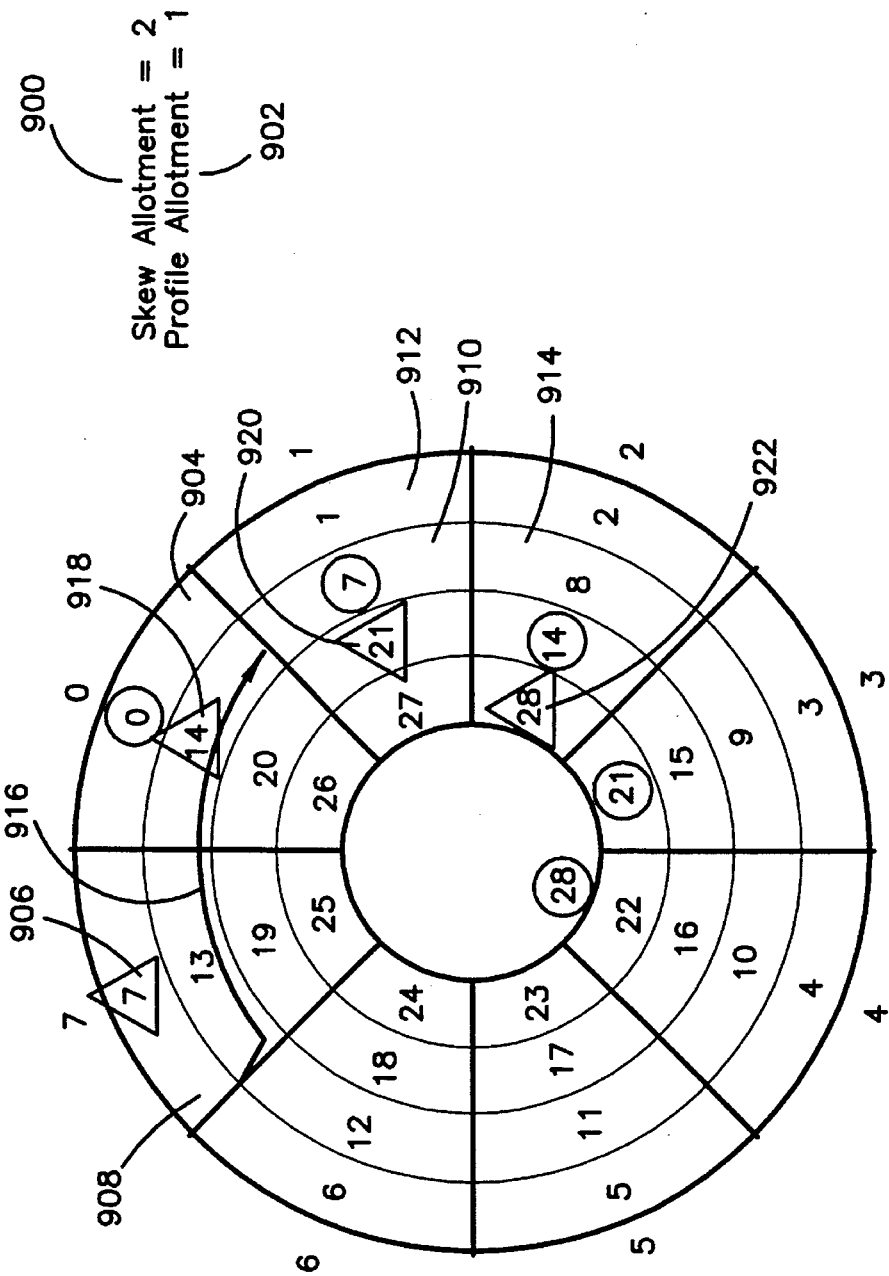
FIG. 13 illustrates a skip profile on a disk without any defects.

The following examples illustrate the skip profile. A skip profile on a disk without any defects is illustrated in FIG. 13. The skew allotment can be set at 2 900 and the profile allotment set at 1 902. Sectors 0 through 6 are shown positioned around the outer zone 904. A profile skip 906 is encountered where sector 7 908 would normally reside. However, due to the profile skip 906, sector 7 910 is skewed to account for the skip until the sector aligns with sector 1 912 on the second outermost zone 914. Thus, two sectors are skipped 916. A skip profile is shown at each of the last sectors for each track. Thus, that sector is recorded after a delay of two sectors on the next innermost zone. Additional skips are shown in sectors 14 918, 21 920, and 28 922.

Figure 14:
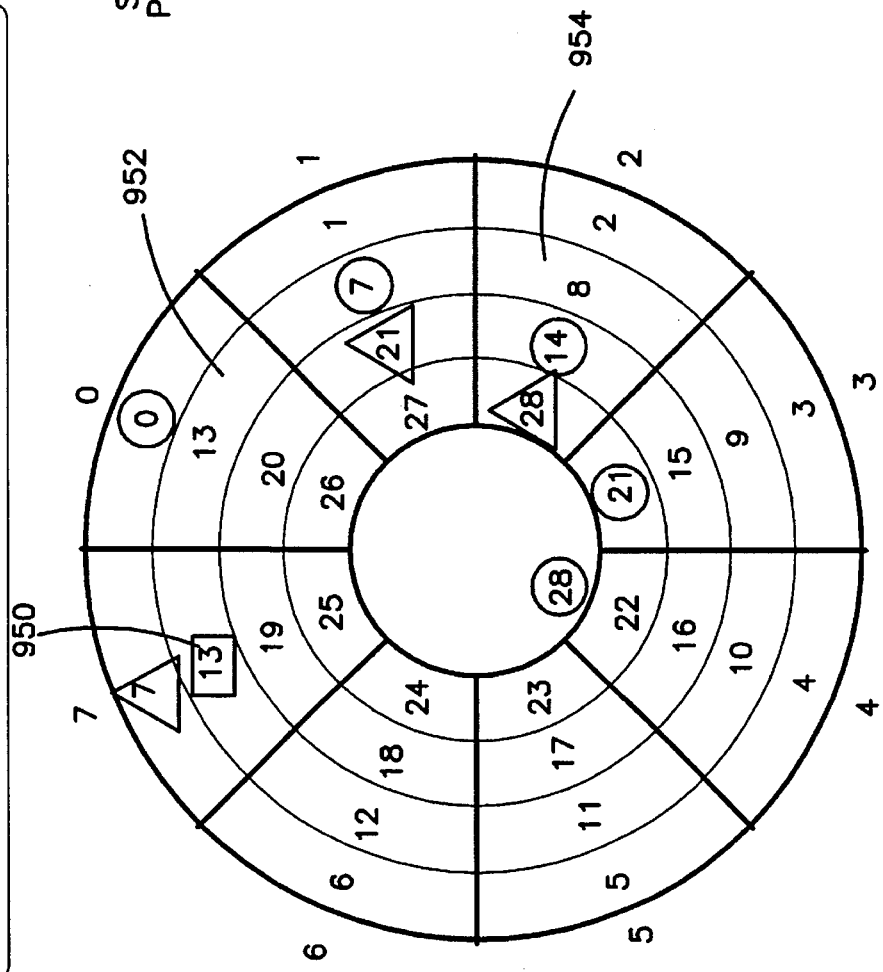
FIG. 14 illustrates a skip profile on a disk having one defect.

FIG. 14 shows an example of skip profile having one defect at sector 13 950. Sector 13 952 is pushed up one notch thereby completing zone 1 954. The remaining sectors are positioned as illustrated in FIG. 5.

Figure 15:
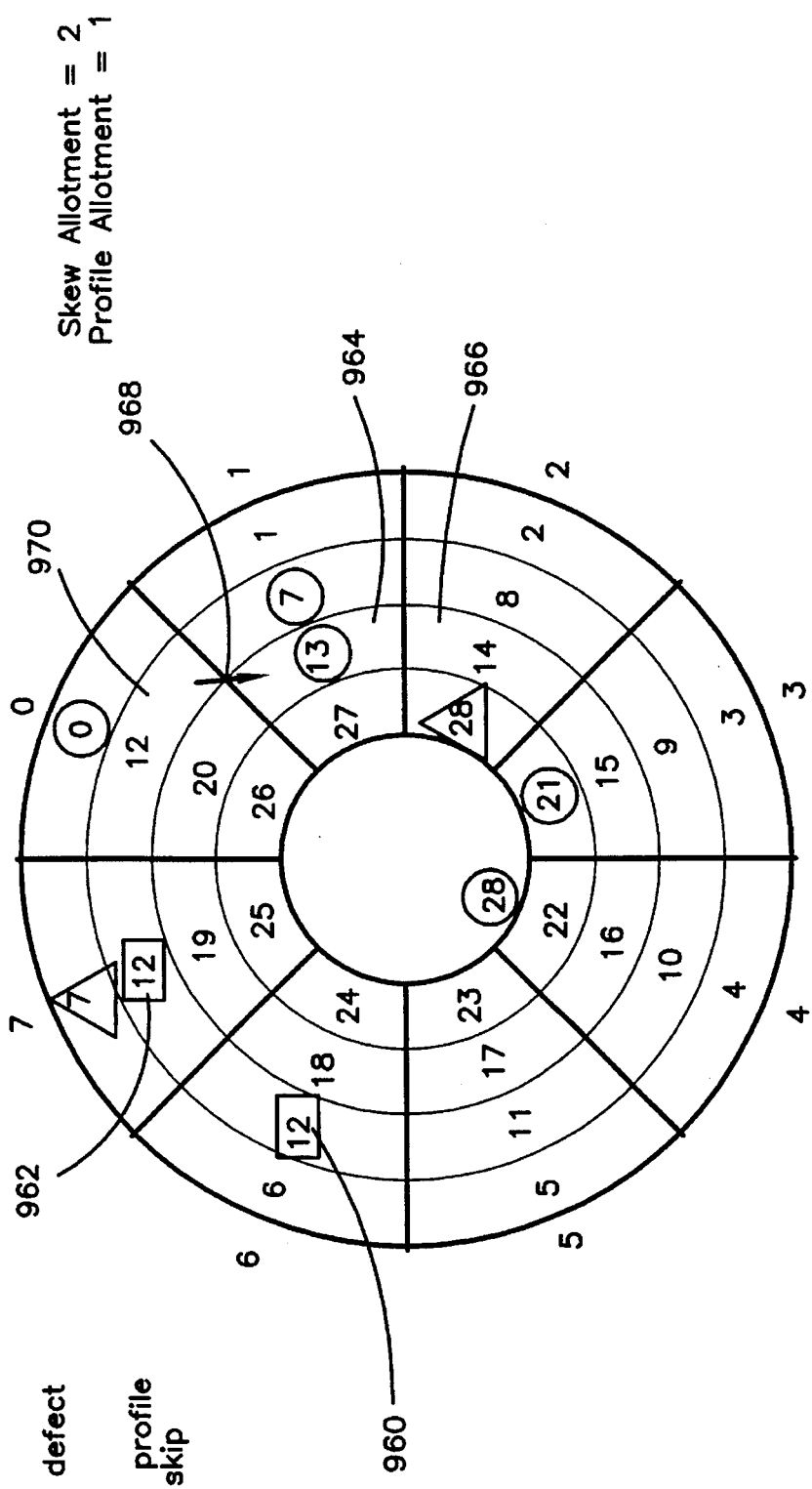
FIG. 15 illustrates a skip profile on a disk having two defects.

FIG. 15 shows an example of a skip profile having two defects. These defects occur at sector 12 960, 962. Sector 13 964 is pushed into zone 2 966 at the sector immediately 968 following sector 12 970.

Figure 16:
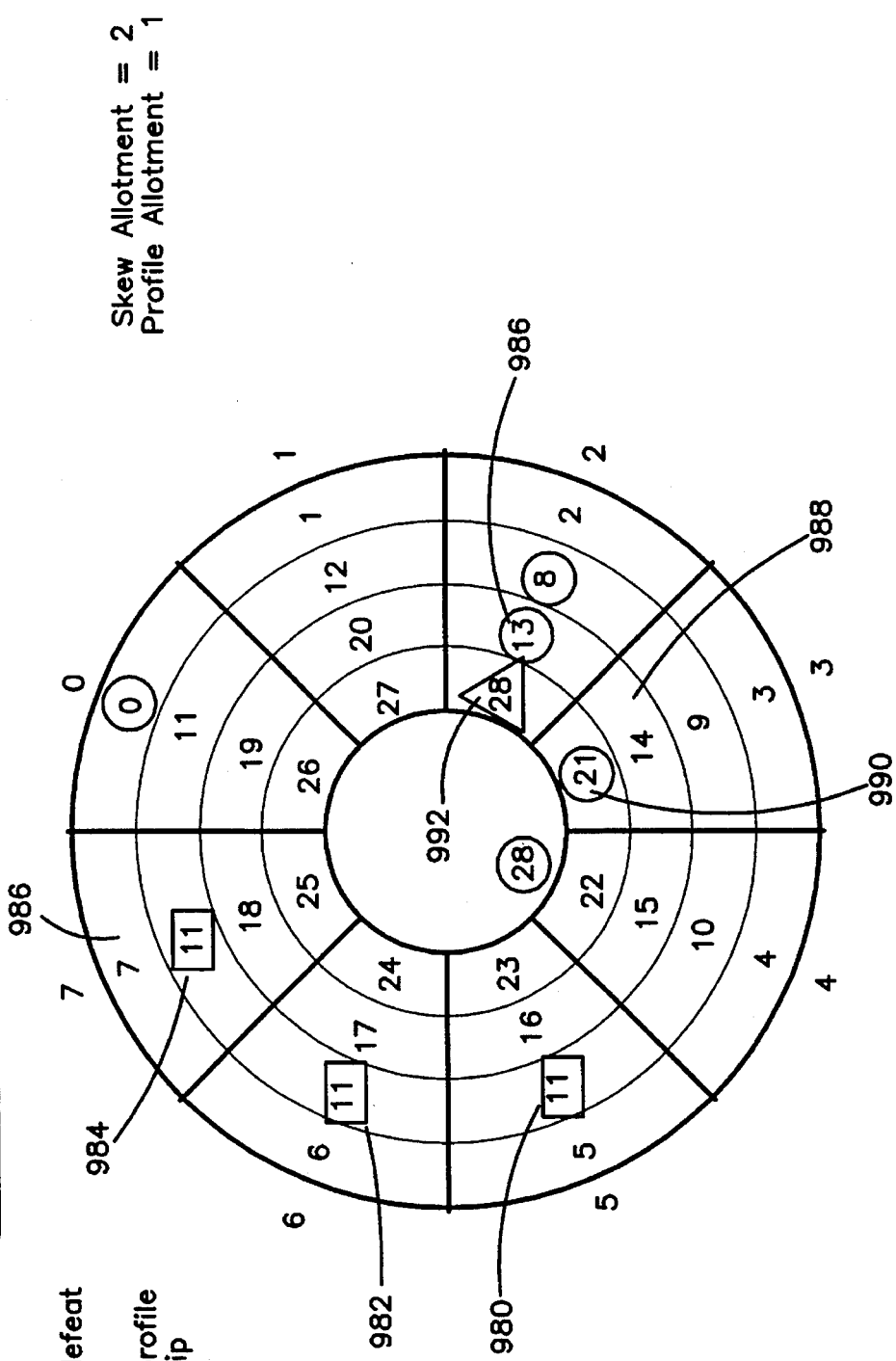
FIG. 16 illustrates a skip profile on a disk having three defects.

Finally, a skip profile example is illustrated in FIG. 16 having three defects. These defects occur at sector 11 980, 982, 984. Here sector 13 986 is positioned where sector 14 was positioned in FIGS. 5–7. However, note that the sectors which were profile skips 986, 988, 990 have been used by the disk thereby leaving only one profile skip 992.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A disk drive system, comprising:

a plurality of spindles; and at least one storage disk rotating around each spindle, wherein each disk comprises a plurality of tracks arranged according to an adaptive synchronization skew into synchronization zones, the adaptive synchronization skew comprising an excess transition time period associated with each synchronization zone, wherein the excess time period comprises raw skew and synchronization skew, the skew being used to shift sector locations in response to excessive defects occurring in the synchronization zone on the disk, and wherein the excess transition time period allows maximum amount of disk capacity to be used while maintaining synchronization of the disks, the phase of the disks in the system being synchronized without consuming additional disk storage capacity.

2. The disk drive system of claim 1 wherein each disk further comprises skip profiles for controlling the distribution of unused sectors across the disks, the skip profiles being distributed to model the defect profile in the worst disk in the system.

3. The disk drive system of claim 2 wherein the skip profile and adaptive synchronization skew is designed to smooth defects in excess of a control allowance of a bad zone by dividing the excessive defects in half and distributing half of the defects to the zone before the bad zone and half of the defects to the zone after the bad zone.

4. The disk drive system of claim 3 wherein at least one of the tracks is divided into a number of angular sectors including only data sectors for recording user data and servo sectors having pre-recorded head positioning information for identifying track and servo sector locations, wherein information establishing the circumferential locations and identities of the data sectors is encoded within the servo sectors.

5. The disk drive system of claim 1 wherein each disk further comprises skip profiles for controlling the distribution of unused sectors across the disks, the skip profiles being distributed to model the defect profile in the worst disk in the system.

6. The disk drive system of claim 5 wherein the skip profile and adaptive synchronization skew is designed to smooth defects in excess of a control allowance of a bad zone by dividing the excessive defects in half and distributing half of the defects to the zone before the bad zone and half of the defects to the zone after the bad zone.

7. The disk drive system of claim 1 further comprising:

a skip profile map for mapping out skip sectors, the skip sectors controlling the distribution of unused sectors across the storage devices, the skip profiles being distributed to model a worst case defect profile; and a skew table for defining the excess time period, the excess time period comprising a raw skew value and a synchronization skew value.

8. The disk drive system of claim 7 wherein the unused sectors are reassignable to data sectors that are pushed out due to defects.

9. The disk drive system of claim 1 wherein at least one of the tracks is divided into a number of angular sectors including only data sectors for recording user data and servo sectors having pre-recorded head positioning information for identifying track and servo sector locations, wherein information establishing the circumferential locations and identities of the data sectors is encoded within the servo sectors.

10. A disk drive array storage device for modelling the operation of a single disk drive, comprising:

an interface means for connecting to a computer for receiving and transmitting digital data;

a plurality of disk storage means, each having spindles which the disk storage means are mounted, wherein each disk storage means is arranged into concentric tracks, each track arranged according to an adaptive synchronization skew into synchronization zones, the adaptive synchronization skew comprising an excess transition time period associated with each synchronization zone for synchronizing the phase and speed of rotation of the disk storage devices, the disk storage means further comprising skip profiles for controlling the distribution of unused sectors across the disks, wherein the unused sectors are reassignable to data sectors that are pushed out due to defects; and a common controller connected to the interface means and connected for controlling each of said disk storage means.

11. The disk drive system of claim 10 wherein at least one of the tracks is divided into a number of angular sectors including only data sectors for recording user data and servo sectors having pre-recorded head positioning information for identifying track and servo sector locations, wherein information establishing the circumferential locations and identities of the data sectors is encoded within the servo sectors.

12. A disk drive array storage device for modelling the operation of a single disk drive, comprising:

an interface means for connecting to a computer for receiving and transmitting digital data;

a plurality of spindles having at least one disk storage device mounted thereon, each disk storage device being arranged into concentric tracks, the tracks being arranged according to an adaptive synchronization skew into synchronization zones for synchronizing the disk storage devices, the adaptive synchronization skew comprising an excess transition time period associated with each synchronization zone;

a common controller connected to the interface means and connected for controlling each of said disk storage devices;

a skip profile map for mapping out skip sectors, the skip sectors controlling the distribution of unused sectors across the storage devices, the skip profiles further being distributed to model a defect profile of the average worst storage device in the system;

a skew table for defining an amount of adaptive synchronization skew between synchronization zones, the adaptive synchronization skew comprising a raw skew value and a synchronization skew value; and wherein defect in excess of a control allowance of a bad zone are smoothed using the skew between the zones and the skip profiles, the excess defects being divided in half with half of the defects distributed to the zone before the bad zone and half of the defects being distributed to the zone after the bad zone.

13. The disk drive system of claim 12 wherein the unused sectors are reassignable to data sectors that are pushed out due to defects.

14. The disk drive system of claim 12 wherein at least one of the tracks is divided into a number of angular sectors including only data sectors for recording user data and servo sectors having pre-recorded head positioning information for identifying track and servo sector locations, wherein information establishing the circumferential locations and identities of the data sectors is encoded within the servo sectors.

15. An adaptive skewing method for synchronizing storage disk disposed in a disk drive array storage device, comprising the steps of:

determining a defect profile for storage disks mounted in a disk drive array storage device;

mapping skip profiles to model a defect profile in the storage disk having the worst defect profile in the system;

defining an amount of adaptive synchronization skew between synchronization zones on the storage disk, the adaptive synchronization skew providing an excess transition time for controlling the synchronizing of the phase of the storage disks, the adaptive synchronization skew comprising raw skew and synchronization skew; and smoothing excessive defect profiles in a bad zone by dividing the excessive defects in half and distributing half of the defects to the zone before the bad zone and half of the defects to the zone after the bad zone.

16. An adaptive skewing method for synchronizing storage disk disposed in a disk drive array storage device, comprising the steps of:

storing data on tracks on disks in a multiple disk drive array storage device according to an adaptive synchronization skew into synchronization zones;

utilizing the adaptive synchronization skew to control sector locations of logical customer data sectors;

maintaining a fixed uniform distribution of skips across the entire surface of the disk drive, the skips representing excess unused storage capacity;

spreading the unused capacity across the file at rates consistent with a desired profile at the ends of the synchronization zones according to the adaptive synchronization skew, the adaptive synchronization skew containing an excess transition time period used for buffering; and using the excess time period and skips located periodically across the disk drive to shift sector locations when defects are present to synchronize the spindle having sector defects with other spindles.

* * * * *

UNITED STATES PATENT AND TRADEMARK OFFICE
CERTIFICATE OF CORRECTION

PATENT NO. : 5,568,606

DATED : October 22, 1996

INVENTOR(S) : J. DOBBEK

PAGE 1 of 2

It is certified that error appears in the above-identified patent and that said Letters Patent is hereby corrected as shown below:

```
In column 2, line 4, "in" should be --is--.

In column 2, line 44, insert --be-- after "can".

In column 5, line 28, insert --,-- after "First".

In column 5, line 31, insert --,-- after "Secondly".

In column 5, line 59, insert --,-- after "Next".

In column 6, line 15, insert --,-- after "Finally".

In column 6, line 23, insert --,-- after "In addition".

In column 6, line 32, insert --,-- after "transfer".

In column 7, line 32, "skips" should be --skip--.

In column 7, line 55, "illustrations" should be
--illustrative--.
```

UNITED STATES PATENT AND TRADEMARK OFFICE
CERTIFICATE OF CORRECTION

| | |
|---|---|
| PATENT NO. : | 5,568,606 |
| DATED : | October 22, 1996 |
| INVENTOR(S) : | J. DOBBEK |

It is certified that error appears in the above-identified patent and that said Letters Patent is hereby corrected as shown below:

In column 9, line 19, insert --a-- after "allows".

Signed and Sealed this

Nineteenth Day of August, 1997

Attest:

BRUCE LEHMAN

*Attesting Officer*  *Commissioner of Patents and Trademarks*